US007779659B2

(12) United States Patent
Tanimoto et al.

(10) Patent No.: US 7,779,659 B2
(45) Date of Patent: Aug. 24, 2010

(54) DOOR HANDLE DEVICE

(75) Inventors: Tetsurou Tanimoto, Anjo (JP); Masaki Nishikawa, Kariya (JP); Yoshimasa Suzuki, Hekinan (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 610 days.

(21) Appl. No.: 11/658,273

(22) PCT Filed: Aug. 1, 2005

(86) PCT No.: PCT/JP2005/014055

§ 371 (c)(1),
(2), (4) Date: Jan. 24, 2007

(87) PCT Pub. No.: WO2006/013831

PCT Pub. Date: Feb. 9, 2006

(65) Prior Publication Data

US 2008/0302148 A1 Dec. 11, 2008

(30) Foreign Application Priority Data

Aug. 5, 2004 (JP) ............................ 2004-229865
Aug. 20, 2004 (JP) ............................ 2004-240973

(51) Int. Cl.
*B60R 25/02* (2006.01)

(52) U.S. Cl. ............................ 70/210; 70/208; 70/224; 292/341.12; 292/336.3

(58) Field of Classification Search .................. 70/209, 70/210, 224, 208; 292/336.3, DIG. 56, DIG. 57, 292/DIG. 73, 341.12
See application file for complete search history.

(56) References Cited

U.S. PATENT DOCUMENTS

| | | | | |
|---|---|---|---|---|
| 3,834,198 | A * | 9/1974 | Wiczer | 70/208 |
| 5,862,690 | A * | 1/1999 | Jancsek | 70/224 |
| 6,167,779 | B1 * | 1/2001 | Sano et al. | 74/543 |
| 6,401,302 | B1 * | 6/2002 | Josserand et al. | 16/444 |
| 6,471,262 | B1 * | 10/2002 | Schwab | 292/336.3 |
| 6,474,119 | B1 * | 11/2002 | Halvorson et al. | 70/208 |
| 6,519,984 | B1 * | 2/2003 | Morris | 70/210 |

(Continued)

FOREIGN PATENT DOCUMENTS

JP 6-65578 U 9/1994

(Continued)

OTHER PUBLICATIONS

*Japanese Office Action dated Nov. 13, 2007.

(Continued)

*Primary Examiner*—Suzanne D Barrett
(74) *Attorney, Agent, or Firm*—Buchanan Ingersoll & Rooney PC

(57) ABSTRACT

A door handle device is provided with: a handle member 10; a handle frame member 20 swingably supporting the handle member 10, the handle frame member being fixed to a door 50; and a key cylinder cover 49 integrated with a key cylinder device 30 capable of locking the door 50. The handle member 10 has a swing center axis O about which the handle member 10 swings relative to the handle frame member 20. On the slide center axis O, an engagement pin 14 is interposed between the handle member 10 and the key cylinder cover 49.

9 Claims, 5 Drawing Sheets

U.S. PATENT DOCUMENTS

| | | | | |
|---|---|---|---|---|
| 6,662,605 | B2 * | 12/2003 | Molzer | 70/210 |
| 6,715,807 | B2 * | 4/2004 | Molzer | 292/336.3 |
| 6,964,439 | B2 * | 11/2005 | Nomura et al. | 292/336.3 |
| 7,011,349 | B2 * | 3/2006 | Nomura et al. | 292/347 |
| 7,275,772 | B2 * | 10/2007 | Lee | 292/336.3 |
| 7,284,776 | B2 * | 10/2007 | Cummins et al. | 292/336.3 |
| 7,422,251 | B2 * | 9/2008 | Tanimoto et al. | 292/347 |
| 7,431,357 | B2 * | 10/2008 | Pudney | 292/336.3 |
| 7,437,803 | B2 * | 10/2008 | Watanabe et al. | 16/412 |
| 2002/0124606 | A1 * | 9/2002 | Muneta | 70/208 |
| 2003/0122385 | A1 * | 7/2003 | Monig | 292/336.3 |
| 2005/0236846 | A1 * | 10/2005 | Hidaka et al. | 292/216 |
| 2006/0028030 | A1 * | 2/2006 | Tanimoto et al. | 292/336.3 |
| 2006/0038417 | A1 * | 2/2006 | Pudney | 292/336.3 |
| 2006/0255600 | A1 * | 11/2006 | Belchine et al. | 292/336.3 |
| 2006/0284430 | A1 * | 12/2006 | Purdy et al. | 292/336.3 |
| 2007/0069533 | A1 * | 3/2007 | Cummins et al. | 292/336.3 |
| 2007/0182166 | A1 * | 8/2007 | Schindler et al. | 292/336.3 |
| 2008/0001415 | A1 * | 1/2008 | Cummins et al. | 292/336.3 |
| 2008/0054652 | A1 * | 3/2008 | Cummins et al. | 292/336.3 |
| 2008/0088139 | A1 * | 4/2008 | Sunahara et al. | 292/336.3 |
| 2008/0185850 | A1 * | 8/2008 | Takaya et al. | 292/336.3 |
| 2008/0277948 | A1 * | 11/2008 | Takaya et al. | 292/336.3 |
| 2009/0026774 | A1 * | 1/2009 | Watanabe et al. | 292/336.3 |

FOREIGN PATENT DOCUMENTS

| | | | |
|---|---|---|---|
| JP | 8-4366 | A | 1/1996 |
| JP | 8-144609 | A | 6/1996 |
| JP | 2525827 | Y2 | 11/1996 |
| JP | 2000-310066 | A | 11/2000 |
| JP | 2001-32579 | A | 2/2001 |
| JP | 2003-269013 | A | 9/2003 |

OTHER PUBLICATIONS

*Japanese Office Action dated Dec. 11, 2007 with partial English translation.
*International Search Report dated Oct. 21, 2005.

* cited by examiner

DOOR HANDLE DEVICE

BACKGROUND OF THE INVENTION

1. Field of the Invention

The present invention relates to a door handle device, and in particular, to a door handle device which is suitable as an outside door handle.

2. Background of the Invention

A conventional handle device has been known that is disclosed in patent document 1. The door handle device is provided with a handle member and a base. The base is fixed to a door in a state in which the handle member can be swingably supported. A cushion rubber is mounted on the base. By means of the cushion rubber, a closed position of the handle member can be restricted, and in this manner, a sophisticated operational sound can be achieved at a time that a handle is returned to its original position.

However, in the door handle device described above, a key cylinder member is not provided integrally. A key cylinder member is provided on the door in addition to the door handle device.

In this respect, in recent years, a door handle device has been developed that is integrated with a key cylinder member. In such a door handle device, demands have been made for improvements in design properties by reducing, as far as possible, the gap between the handle member mounted on the base, i.e., a handle frame member, and the key cylinder member.

However, the handle member is swingably mounted on the handle frame member, and thus, a slight degree of rattling may occur in the gap between these two members. Therefore, if the gap between the handle member and the key cylinder member is minimized, the handle member and the key cylinder member can collide with each other and produce abnormal noise.

Patent document 1: Japanese Laid-Open Patent Publication No. 2001-32579

SUMMARY OF THE INVENTION

The present invention has been made in view of the conventional circumstances described above. It is an object of the present invention to provide a door handle device that is capable of inhibiting the rattling of a handle member and that is capable of reducing the occurrence of abnormal noises between a handle member that is mounted on a handle frame member, and a key cylinder member.

In order to solve the problem described above, according to one aspect of the present invention, a door handle device is provided comprising: a handle member; a handle frame member swingably supporting the handle member, the handle frame member being fixed to a handle frame; and a key cylinder member that is fixed to the handle frame member and capable of locking the door. In the door handle device, the handle member has a swing center axis relative to the handle frame member. Between the handle member and the key cylinder member, a bearing member is interposed on the swing center axis.

Therefore, according to the door handle device in an aspect of the present invention, rattling of the handle member is inhibited, and since the handle member is mounted on the handle frame member, the occurrence of abnormal noises between the handle member and the key lock member is reduced.

DETAILED DESCRIPTION OF THE PREFERRED EMBODIMENTS

An embodiment of a door handle device of the present invention will now be described with reference to the accompanying drawings.

Figure 1:
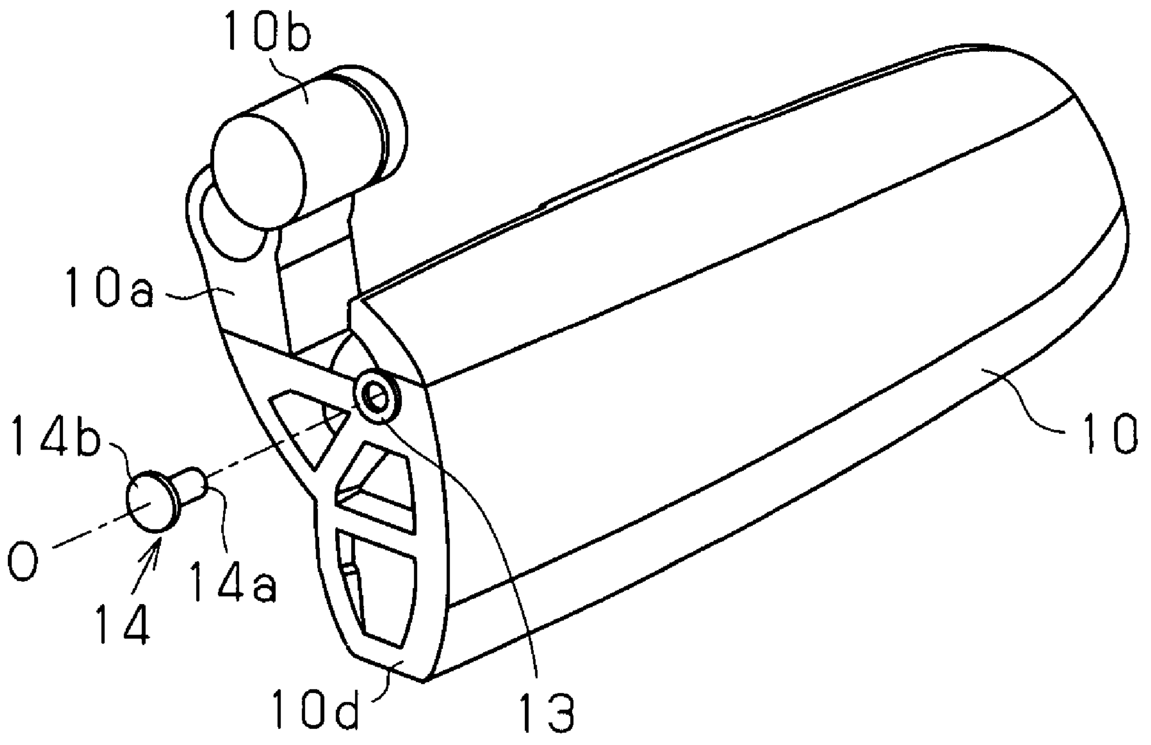
FIG. 1 is a perspective view of a handle member in an embodiment of the present invention.

The door handle device according to the present embodiment is provided with the parts listed below. First, as illustrated in FIG. 1, a handle member 10 (for example, a metallic or a plated synthetic resin handle member) is prepared as a pull-up type of outside door handle. The handle member 10 is provided with an arm portion 10*a* that extends in an upward direction from a rear surface. A counterweight 10*b* is mounted on an upper end of the arm portion 10*a*.

Figure 2A:
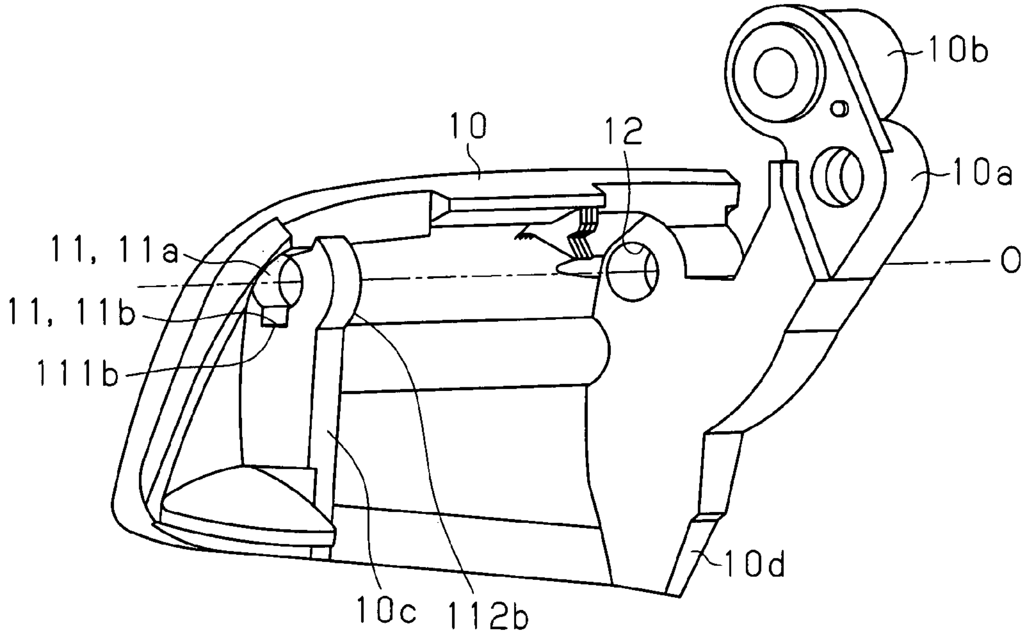
FIG. 2(*a*) is a perspective view of rear surface of the handle member, and FIG. 2(*b*) is a perspective view when the rear surface of the handle member is seen from an angle that is different from that illustrated in FIG. 2(*b*)
Figure 2B:
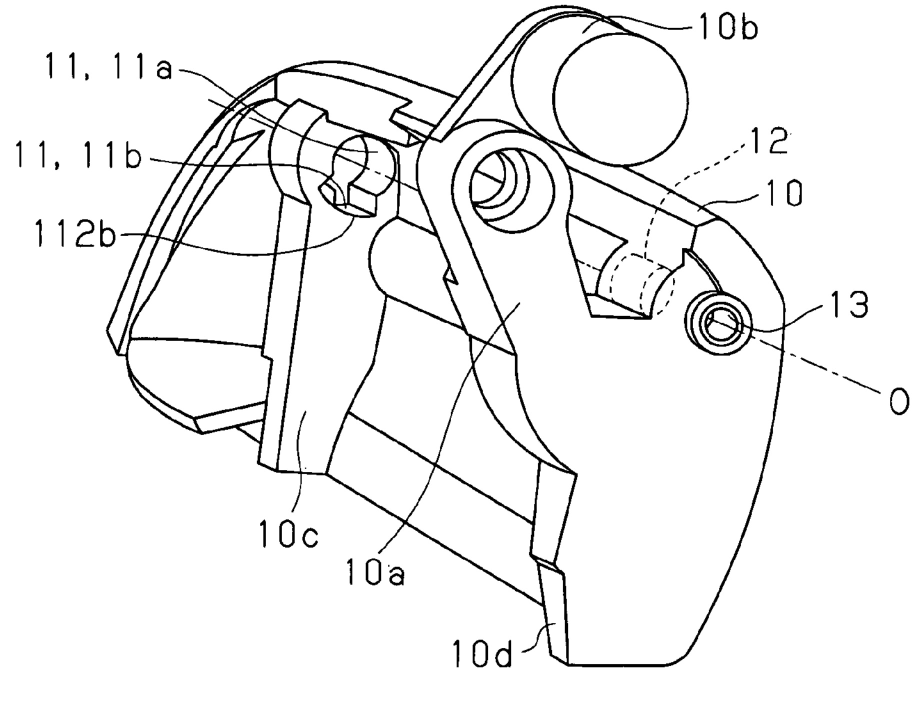

As illustrated in FIG. 2(*a*) and FIG. 2(*b*), on the rear surface of the handle member 10, a first wall portion 10*c* is provided in a protruding manner at a position spaced laterally from the arm portion 10*a*. A first engagement hole 11 extending horizontally is penetrated and formed at an upper part of the first wall portion 10*c*. The first engagement hole 11 is composed of a circular portion 11*a*, and a recessed portion 11*b* that is formed at a lower part of the circular portion 11*a*.

At the recessed portion 11*b*, an outlet 112*b* formed on an inside surface of the first wall portion 10*c* is formed to be wider than an inlet 111*b* formed on an outside surface of the first wall portion 10*c*. In addition, a second wall portion 10*d* is formed at the handle member 10 so as to be positioned at a proximal end of the arm portion 10*a*. Further, a concave second engagement hole 12 is formed on an upper internal surface of the second wall portion 10*d*. The second engagement hole 12 is positioned coaxially with the first engagement hole 11, and extends horizontally. The first engagement hole 11 and the second engagement hole 12 are positioned on a swing center axis O of the handle member 10.

Figure 8:
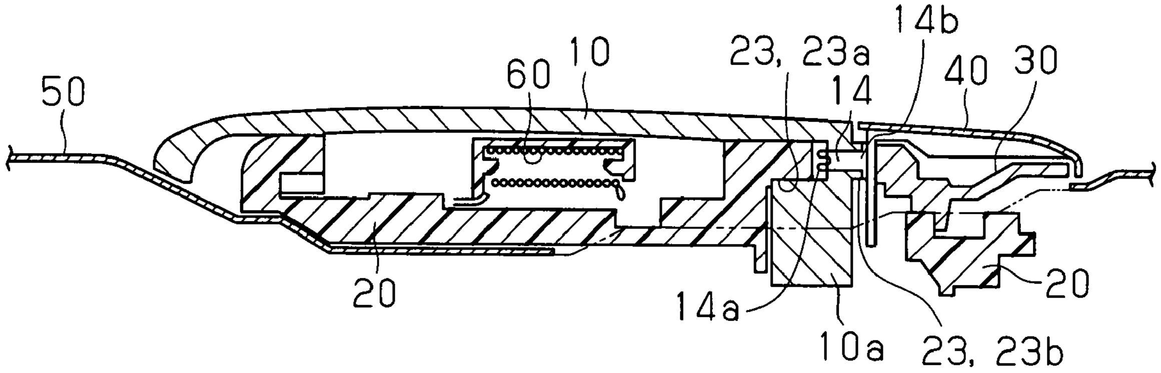
FIG. 8 illustrates the door handle device that has been assembled onto a door and is a cross-sectional view taken along line 8-8 of FIG. 6.

Further, on an upper external surface of the second wall portion 10*d*, an engagement hole 13 is formed on the swing center axis O of the handle member 10. An engagement pin 14 that serves as a bearing member, as illustrated in FIG. 1, is engaged with the engagement hole 13. This engagement pin 14 is made of polyacetal. Apart from polyacetal, the engagement pin 14 may be formed by the use of a sliding material such as nylon. As illustrated in FIG. 1 and FIG. 8, the engagement pin 14 has a diameter-expanding portion 14*a* that has a cutout at its distal end, and a slide contact portion 14*b* that is continuous to the diameter-expanding portion 14*a* and that comes into contract with the second wall portion 10*d*. Therefore, after the engagement pin 14 has been inserted into the engagement hole 13, and protruded onto an internal surface of the second wall portion 10*d*, the diameter-expanding portion 14*a* expands, and, is then engaged with an internal surface of the second wall portion 10*d*. Further, the slide contact portion 14*b* contacts an external surface of the second wall portion 10*d*. The external surface of the second wall portion 10*d* of the handle member 10 configures a boundary surface with a key cylinder member.

Figure 3:
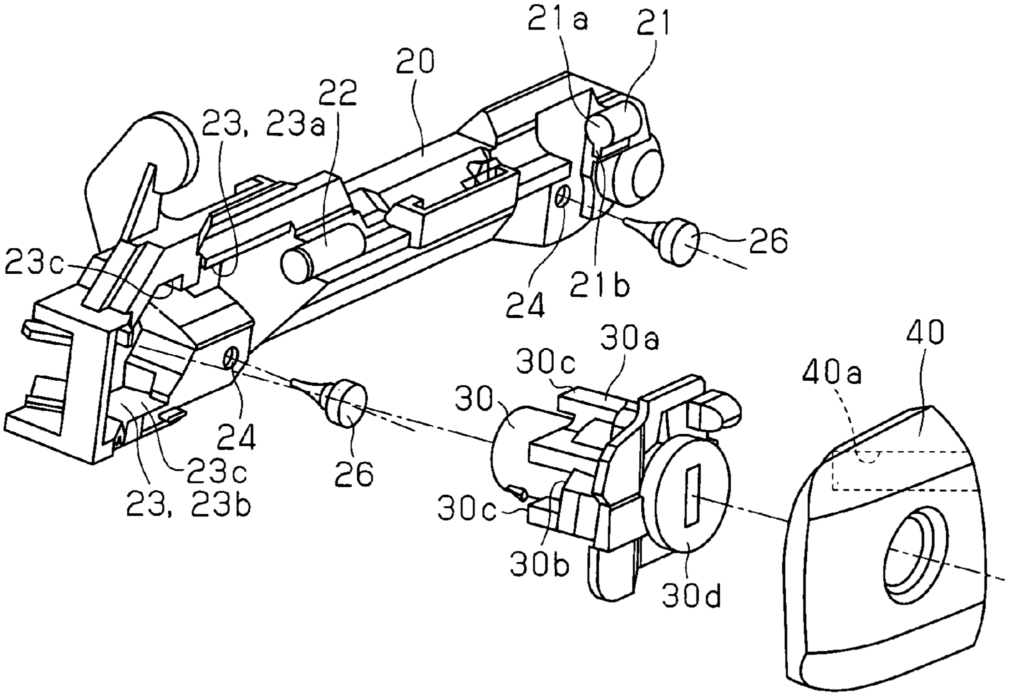
FIG. 3 is an exploded perspective view of a handle frame member and a key cylinder member.

In addition, as illustrated in FIG. 3, a synthetic resin handle frame member 20 is prepared. A first engagement shaft portion 21 that extends horizontally is provided on a right end front surface of the handle frame member 20. The first engagement shaft portion 21 is composed of a circular portion 21*a*, and a protruding portion 21*b* that is formed at a lower part of the circular portion 21*a*. The protruding portion 21*b* has an external shape that is substantially identical in size to an inlet 111*b* of the recessed portion 11*b* that has been described above.

In addition, a second engagement shaft portion 22 positioned coaxially with the first engagement shaft portion 21, and extending horizontally, is provided on a central frontal surface of the handle frame member 20. Further, an opening 23 is formed on a left end part of the handle frame member 20. At the opening 23 are continuously formed a first portion 23*a* for permitting communication between an arm portion 10*a* and a counterweight 10*b* of the handle member 10, and a second portion 23*b* for permitting communication of a key cylinder device 30 that will be described later.

The handle frame member 20 is longer than the handle member 10 approximately by a difference equivalent to the length of the second portion 23*b*. A pair of engaging and locking holes 24 is formed on a front surface of the handle frame member 20, and configures a lower contact point that is capable of contacting the handle member 10. Further, a rubber engaging and locking pin is prepared as an interposing member that is capable of being engagingly locked with each engaging and locking hole 24.

Further, a key cylinder device 30 that is capable of locking a door 50 illustrated in FIG. 8, and a key cylinder cover 40 (for example, a metallic or plated synthetic resin cover) having a key hole of the key cylinder device 30 are prepared. A key cylinder member is composed of the key cylinder device 30 and the key cylinder cover 40. As illustrated in FIG. 3, a guide groove 40*a* for guiding the engagement pin 14 that has been described above is formed on a right side part of the key cylinder cover 40. An external surface of the second wall portion 10*d* of the handle member 10 configures a boundary surface with the key cylinder cover 40 in the key cylinder member.

Figure 9:
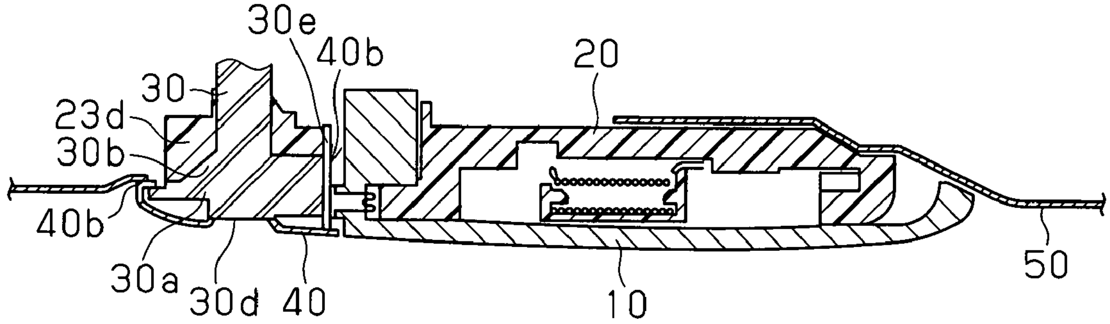
FIG. 9 illustrates the door handle device that has been assembled onto a door and is a cross-sectional view taken along line 9-9 of FIG. 6.

As illustrated in FIG. 3 and FIG. 9, the key cylinder device 30 is provided with a key hole 30*d* at its center. A metal flange portion 30*a* is integrally molded with the key cylinder device 30 about the key hole 30*d* through casting. The flange portion 30*a* has a width that is greater than that of the opening 23 of the handle frame member 20. After a flange-positioning portion 30*c* of the key cylinder device 30 has been inserted into a base-positioning portion 23*c*, the flange portion 30*a* abuts against a peripheral edge of the opening 23 of the handle frame member 20, and the handle frame member 20 functions as a stopper.

Further, as illustrated in FIG. 9, the handle frame member 20 is provided with a tapered portion 23*d* that abuts against a flange tapered portion 30*b* of the key cylinder device 30. These tapered portions are bonded with each other, and positioning is accordingly made possible in a horizontal direction between the key cylinder device 30 and the handle frame member 20.

In this way, a front surface of the handle frame member 20 and the flange portion 30*a* of the key cylinder device 30 abut against each other, and the tapered portion 23*d* of the handle frame member 20 and a flange tapered portion 30*b* of the key cylinder device 30 are bonded with each other. The key cylinder device 30 is thus rigidly supported on the handle frame member 20 so that the possibility of the key cylinder device 30 dropping into the interior of a vehicle door 50 is reduced.

The key cylinder cover 40 is mounted on the key cylinder device 30 from the outside, and has a plurality of claws 40*b* on its outer edge. Each claw 40*b* is engaged with a hook portion 30*e* that is provided on the key cylinder device 30, and the key cylinder cover 40 is thereby fixed to the key cylinder device 30.

Decoration is applied to the key cylinder cover 40 that is mounted on the outside of the key cylinder device 30, and it thus becomes possible to enhance the design properties of a vehicle door handle easily.

The parts of the door handle device thus prepared are assembled as described below.

Figure 4:
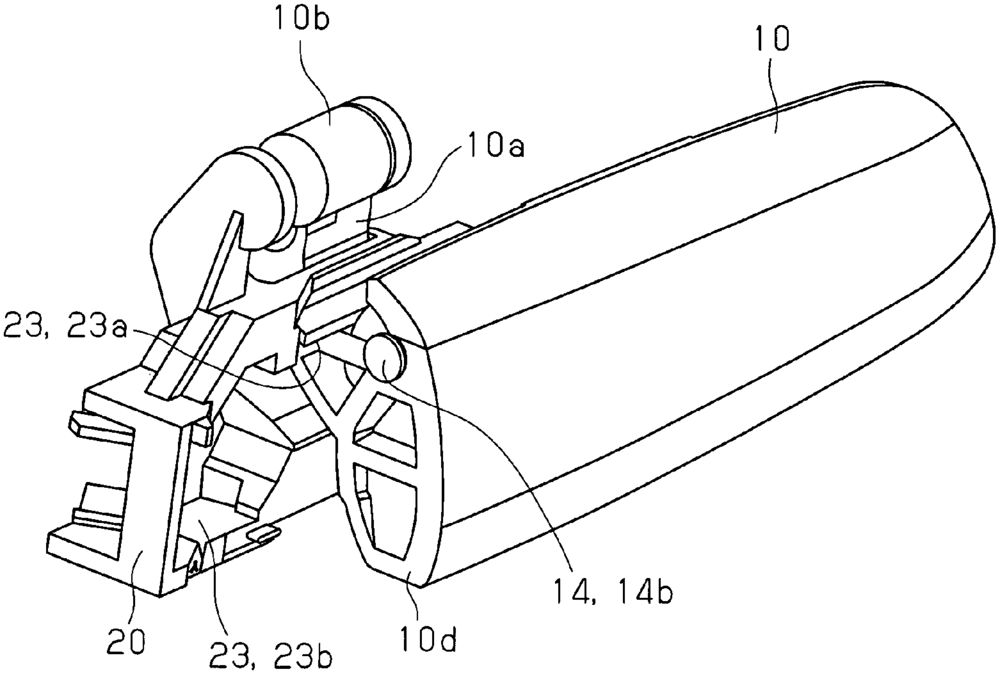
FIG. 4 is a perspective view illustrating a state in which the handle member has been assembled onto the handle frame member.

First, as illustrated in FIG. 4, the counterweight 10*b* and the arm portion 10*a* of the handle member 10 are inserted into the second portion 23*b* of the opening 23 of the handle frame member 20.

Next, the handle member 10 is disposed so as to be at a minimum tilt angle relative to the handle frame member 20. In other words, a rear surface of the handle member 10 is disposed so as to come into close contact with a front surface of the handle frame member 20. Moreover, the first engagement shaft portion 21 of the handle frame member 20 shown in FIG. 3 is inserted into a first engagement hole 11 of the handle member 10 illustrated in FIG. 2 (*a*) and FIG. 2 (*b*), and then, the second engagement shaft portion 22 of the handle frame member 20 is inserted into a second engagement hole 12 of the handle member 10.

At this time, the protruding portion 21*b* of the first engagement shaft portion 21 is engaged with the inlet 111*b* of the recessed portion 11*b* of the first engagement hole 11 as illustrated in FIG. 2 (*a*). As illustrated in FIG. 4, in this state, the handle frame member 20 is slid to the right as viewed in FIG. 4, of the handle member 10. Then, the first engagement shaft portion 21 of the handle frame member 20 is engaged with the first engagement hole 11 of the handle member 10, and the second engagement shaft portion 22 of the handle frame member 20 is engaged with the second engagement hole 12 of the handle member 10.

Next, the handle member 10 is tilted relative to the handle frame member 20, and the handle member 10 is set apart from the handle frame member 20. Also, each engaging and locking pin 26 is engagingly locked with each engaging and locking hole 24 of the handle frame member 20 as illustrated in FIG. 3.

Each engaging and locking pin 26 may be engagingly locked with the handle member 10. In such circumstances, it is necessary to form engaging and locking holes 24 at lower contact points of a handle member that are capable of contacting a handle frame member.

Figure 5:
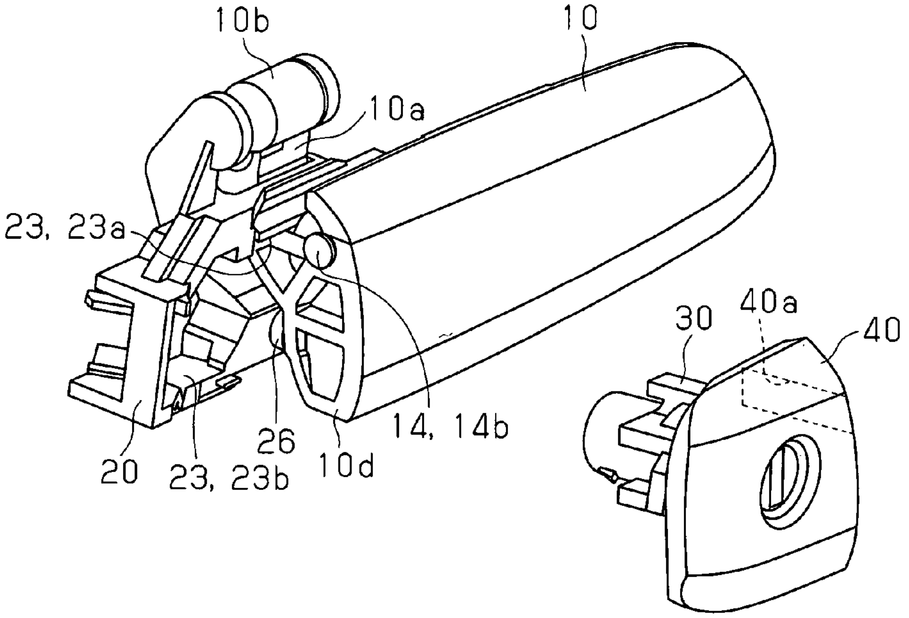
FIG. 5 is an exploded perspective view illustrating a state before the key cylinder member is assembled onto the handle frame member.

As illustrated in FIG. 5, if the engaging and locking pins 26 are temporarily engagingly locked at lower contact points (engaging and locking holes 24 illustrated in FIG. 3), at which the handle frame member 20 and the handle member 10 contact each other, a tilt angle of the handle member 10 relative to the handle frame member 20 will never again be minimized. In a state in which the engaging and locking pin 26 has been mounted, as illustrated in FIG. 1 to FIG. 3, the protruding portion 21*b* of the first engagement shaft portion 21 is engaged with the outlet 112*b* in the recessed portion 11*b* of the first engagement hole 11, and the first engagement shaft portion 21 does not fall off the first engagement hole 11.

Next, as illustrated in FIG. 3, the key cylinder cover 40 is fixed to a surface of the key cylinder device 30. Then, as illustrated in FIG. 5, the key cylinder device 30 is inserted into, and is fixed to, the first portion 23*a* of the opening 23 of the handle frame member 20. At this time, the engagement pin 14 of the handle member 10 is guided into the guide groove 40*a* of the key cylinder cover 40, and then, the engagement pin 14 moves relatively along the guide groove 40*a*.

Figure 6:
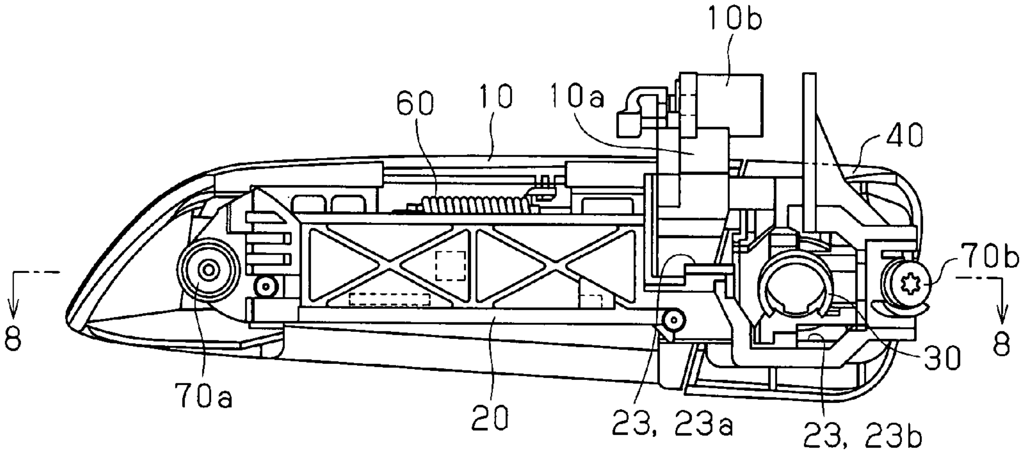
FIG. 6 is a rear view of the door handle device.

At the rear of the door handle device thus assembled, as shown in FIG. 6, an urging spring 60 is engagingly locked between the handle member 10 and the handle frame member 20. The handle frame member 20 is fixed to a door 50, as illustrated in FIG. 8, by means of a fixing screw 70*a* positioned on the left side, as viewed in FIG. 6. Further, the handle frame member 20 is integrated with the key cylinder device 30 and the key cylinder cover 40 by means of a fixing screw 70*b* that is positioned on the right side, as viewed in FIG. 6.

Figure 7:
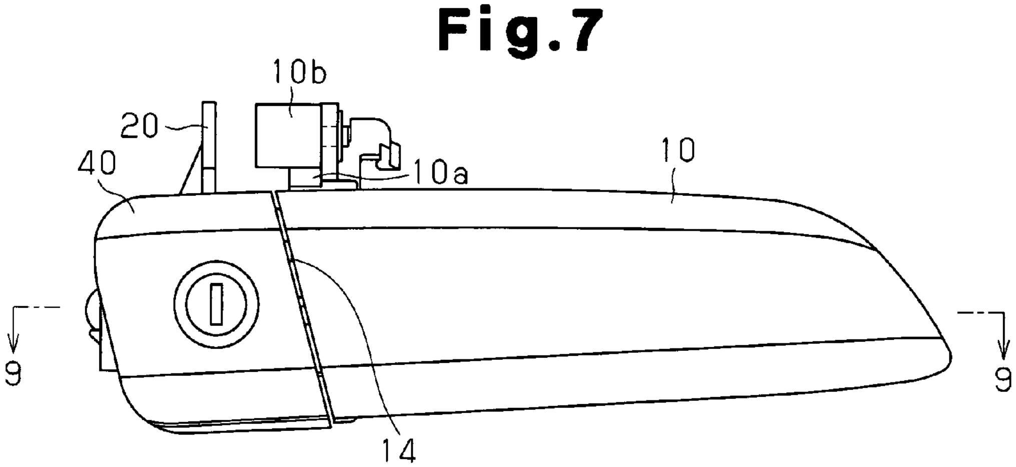
FIG. 7 is a front view of the door handle device.

On the other hand, as illustrated in FIG. 7 to FIG. 9, at a front side of the door handle device, a back surface of the metallic (or plated synthetic resin) handle member 10 and a base surface of metallic (or plated synthetic resin) are flush with each other surface. Thus, a highly decorative door handle device can be obtained. In such a door handle device, as illustrated in FIG. 8, the handle frame member 20 is fixed to the door 50.

In the door handle device assembled according to the embodiment as described above, the key cylinder device 30 is mounted on the handle frame member 20, so that the opening 23 that is positioned lateral to the handle member 10 is formed at the handle frame member 20. The counterweight 10*b* of the handle member 10 is inserted into the first portion 23*a* of the opening 23, and then, the first engagement shaft portion 21 and the second engagement shaft portion 22 of the handle frame member 20 are respectively engaged with the first engagement hole 11 and the second engagement hole 12 of the handle member 10.

At that time, only in circumstances where the engagement angle of the handle member 10 relative to the handle frame member 20 is minimal, the protruding portion 21*b* of the first engagement shaft portion 21 and the recessed portion 11*b* of the first engagement hole 11 can be engaged with each other. The handle member 10 and the handle frame member 20 are engaged with each other. Next, after the engaging and locking pins 26 are positioned at a lower contact point between the handle member 10 and the handle frame member 20, the handle member 10 and the handle frame member 20 do not return to the minimum engagement angle position. Thus, the handle member 10 does not fall off the handle frame member 20. Further, by means of the engaging and locking pins 26, it is possible to inhibit interference between the handle member 10 and the handle frame member 20 after assembly.

In this manner, the handle member 10 is swingably supported on the handle frame member 20, and then, the handle member 10 and the handle frame member 20 are simply assembled. After assembly, the handle member 10 can be swung within a range of the size of the outlet 112*b* of the first engagement hole 11.

Furthermore, in the assembled door handle device, the key cylinder device 30 can be mounted on the opening 23 (second portion 23*b*) of the handle frame member 20 that is positioned lateral to the handle member 10. The opening 23 is required to mount the key cylinder device 30. With the door handle device having the structure described above, the handle member 10 can be firmly assembled onto the handle frame member 20 in the simplest manner.

In particular, in the present embodiment, the key cylinder cover 40 and the handle member 10 integrated with the key cylinder device 30 are disposed on the handle frame member 20 so as to be adjacent to each other. The handle member 10 swings around the swing center axis O relative to the key cylinder cover 40. At that time, on the swing center axis O, a gap between the key cylinder cover 40 and the handle member 10 can be maintained to be constant by means of the engagement pin 14, and rattling of the handle member 10 can thus be inhibited. Further, the engagement pin 14 is positioned on the swing center axis O of the handle member 10 in such a way that slide contact between the handle member 10 and the key cylinder cover 40 can be inhibited. Thus, the occurrence of abnormal noises is inhibited.

Accordingly, the key cylinder device according to the present embodiment inhibits rattling of the handle member 10 and reduces the occurrence of abnormal noises between the handle member 10 that is mounted on the handle frame member 20 and the key cylinder cover 40.

Although the engagement pin 14 is engaged with the handle member 10, the engagement pin 14 may also be engaged with the key cylinder cover 40. In any case, the reliable securement of the gap between the handle member 10 and the key cylinder cover 40 is ensured by the engagement pin 14. Therefore, the occurrence of abnormal noises is reliably reduced.

The invention claimed is:

1. A door handle device comprising:

a handle member;

a handle frame member that swingably supports the handle member, the handle frame member being fixed to a door; and a key cylinder member that is fixed to the handle frame member, the key cylinder member being capable of locking the door, wherein the handle member has a swing center axis about which the handle member swings relative to the handle frame member, and wherein, between the handle member and the key cylinder member, an engagement pin is located such that an axis of the engagement pin extends along the swing center axis and is interposed on a boundary surface between the handle member and the key cylinder member.

2. The door handle device according to claim 1, wherein the engagement pin protrudes from at least one of the handle member and the key cylinder member.

3. The door handle device according to claim 1, wherein the engagement pin is formed of a resin material that contains at least polyacetal and nylon.

4. The door handle device according to claim 1, wherein an engagement hole, which is positioned on a boundary surface with the key cylinder member is positioned on the swing center axis, is formed on the handle member, and the engagement pin is engaged with the engagement hole.

5. The door handle device according to claim 1, wherein the engagement pin is made of polyacetal.

6. The door handle device according to claim 1, wherein the engagement pin is provided with a diameter-expanding portion that has a cutout at a distal end thereof, and a slide contact portion that is continuous to the diameter-expanding portion, the slide contact portion contacting the handle member and the key cylinder member.

7. The door handle device according to claim 1, wherein the key cylinder member is provided with a key cylinder device that is capable of locking the door and a key cylinder cover that covers the key cylinder device, the key cylinder cover having a key hole, wherein the key cylinder cover is formed of one of a metal and a plated synthetic resin.

8. The door handle device according to claim 1, wherein the handle member is a pull-up type outside door handle.

9. The door handle device according to claim 1, wherein the axis of the engagement pin is in coaxial alignment with the swing center axis.

* * * * *